United States Patent
Parker et al.

(10) Patent No.: US 11,388,401 B2
(45) Date of Patent: Jul. 12, 2022

(54) EXTENDED TRANSFORM PARTITIONS FOR VIDEO COMPRESSION

(71) Applicant: GOOGLE LLC, Mountain View, CA (US)

(72) Inventors: Sarah Parker, San Francisco, CA (US); Debargha Mukherjee, Cupertino, CA (US); Yue Chen, Kirkland, WA (US); Elliott Karpilovsky, Santa Clara, CA (US); Urvang Joshi, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/912,767

(22) Filed: Jun. 26, 2020

(65) Prior Publication Data
US 2021/0409705 A1    Dec. 30, 2021

(51) Int. Cl.
*H04N 19/119* (2014.01)
*H04N 19/12* (2014.01)
(Continued)

(52) U.S. Cl.
CPC .......... *H04N 19/119* (2014.11); *G06N 20/00* (2019.01); *H04N 19/12* (2014.11); *H04N 19/176* (2014.11); *H04N 19/61* (2014.11)

(58) Field of Classification Search
CPC ...... H04N 19/12; H04N 19/61; H04N 19/119; H04N 19/176; G06N 20/00
See application file for complete search history.

(56) References Cited

U.S. PATENT DOCUMENTS

| 2012/0230411 A1* | 9/2012 | Liu | H04N 19/96 |
| | | | 375/240.16 |
| 2013/0003824 A1* | 1/2013 | Guo | H04N 19/122 |
| | | | 375/240.03 |

(Continued)

FOREIGN PATENT DOCUMENTS

KR    20070104358 A  * 10/2007  ............. H04N 19/46

OTHER PUBLICATIONS

Bankoski, et al., "Technical Overview of VP8, An Open Source Video Codec for the Web", Jul. 11, 2011, 6 pp.

(Continued)

*Primary Examiner* — Dave Czekaj
*Assistant Examiner* — Shanika M Brumfield
(74) *Attorney, Agent, or Firm* — Young Basile Hanlon & MacFarlane, P.C.

(57) ABSTRACT

Transform-level partitioning of a prediction residual block is performed to improve compression efficiency of video data. During encoding, a prediction residual block is generated responsive to prediction-level partitioning performed against a video block, a transform block partition type to use is determined based on the prediction residual block, a non-recursive transform-level partitioning is performed against the prediction residual block according to the transform block partition type, and transform blocks generated as a result of the transform-level partitioning are encoded to a bitstream. During decoding, a symbol representative of the transform block partition type used to encode transform blocks is derived from the bitstream, inverse transformed blocks are produced by inverse transforming encoded video data associated with the prediction residual block, and the prediction residual block is reproduced according to the transform block partition type and used to reconstruct the video block, which is output within an output video stream.

20 Claims, 10 Drawing Sheets

(51) Int. Cl.
  *G06N 20/00* (2019.01)
  *H04N 19/176* (2014.01)
  *H04N 19/61* (2014.01)

(56) References Cited

U.S. PATENT DOCUMENTS

| | | | | |
|---|---|---|---|---|
| 2013/0107950 A1* | 5/2013 | Guo | .................... | H04N 19/122 375/240.12 |
| 2016/0219290 A1* | 7/2016 | Zhao | .................... | H04N 19/60 |
| 2018/0227585 A1* | 8/2018 | Wang | .................. | H04N 19/503 |
| 2019/0342580 A1* | 11/2019 | Zhao | .................... | H04N 19/70 |
| 2020/0296366 A1* | 9/2020 | Chono | ................ | H04N 19/176 |
| 2021/0203975 A1* | 7/2021 | Chen | ..................... | H04N 19/70 |

OTHER PUBLICATIONS

Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
Yue Chen et al.; "An Overview of Core Coding Tools in the AV1 Video Codec"; 2018 Picture Coding Symposium; Jun. 2018; 5 Pages.

* cited by examiner

EXTENDED TRANSFORM PARTITIONS FOR VIDEO COMPRESSION

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

Disclosed herein are, inter alia, systems and techniques for extended transform partitions for video compression.

A method for encoding a video block according to an implementation of this disclosure comprises performing prediction-level partitioning against the video block to partition the video block into one or more first sub-blocks. A prediction residual block is generated for a first sub-block of the one or more first sub-blocks based on a prediction of the first sub-block. A transform block partition type for performing transform-level partitioning against the prediction residual block is determined, in which the transform block partition type is one of multiple transform block partition types available for partitioning the prediction residual block. A single, non-recursive transform-level partitioning is performed against the prediction residual block using the transform block partition type to partition the prediction residual block into a plurality of second sub-blocks. A transform block is generated for a second sub-block of the plurality of second sub-blocks by transforming video data of the second sub-block. The transform block and a symbol representative of the transform block partition type are then encoded to a bitstream.

A method for decoding an encoded video block from a bitstream according to an implementation of this disclosure comprises deriving, from the bitstream, a first symbol representing a first transform block partition type used for non-recursive transform-level partitioning of a first prediction residual block including first video data of the encoded video block and a second symbol representing a second transform block partition type used for non-recursive transform-level partitioning of a second prediction residual block including second video data of the encoded video block, in which the first transform block partition type and the second transform block partition type are different. The first prediction residual block is produced according to the first symbol by inverse transforming and combining a plurality of first encoded transform sub-blocks associated with the first video data. The second prediction residual block is produced according to the second symbol by inverse transforming and combining a plurality of second encoded transform sub-blocks associated with the second video data. A video block including the first video data and the second video data is then reconstructed using the first prediction residual block and the second prediction residual block. The video block is then output within an output video stream for storage or display.

A method for decoding an encoded video block from a bitstream according to an implementation of this disclosure comprises deriving, from a bitstream to which the encoded video block is encoded, a symbol representing a transform block partition type used for non-recursive transform-level partitioning of a prediction residual block encoded to produce the encoded video block. A first inverse transformed block is produced by inverse transforming a first encoded transform sub-block associated with first video data of the prediction residual block. A second inverse transformed block is produced by inverse transforming a second encoded transform sub-block associated with second video data of the prediction residual block. The prediction residual block is then produced according to the transform block partition type represented by the symbol using the first inverse transformed block and the second inverse transformed block. A video block including the first video data and the second video data is reconstructed using the prediction residual block. The video block is then output within an output video stream for storage or display.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
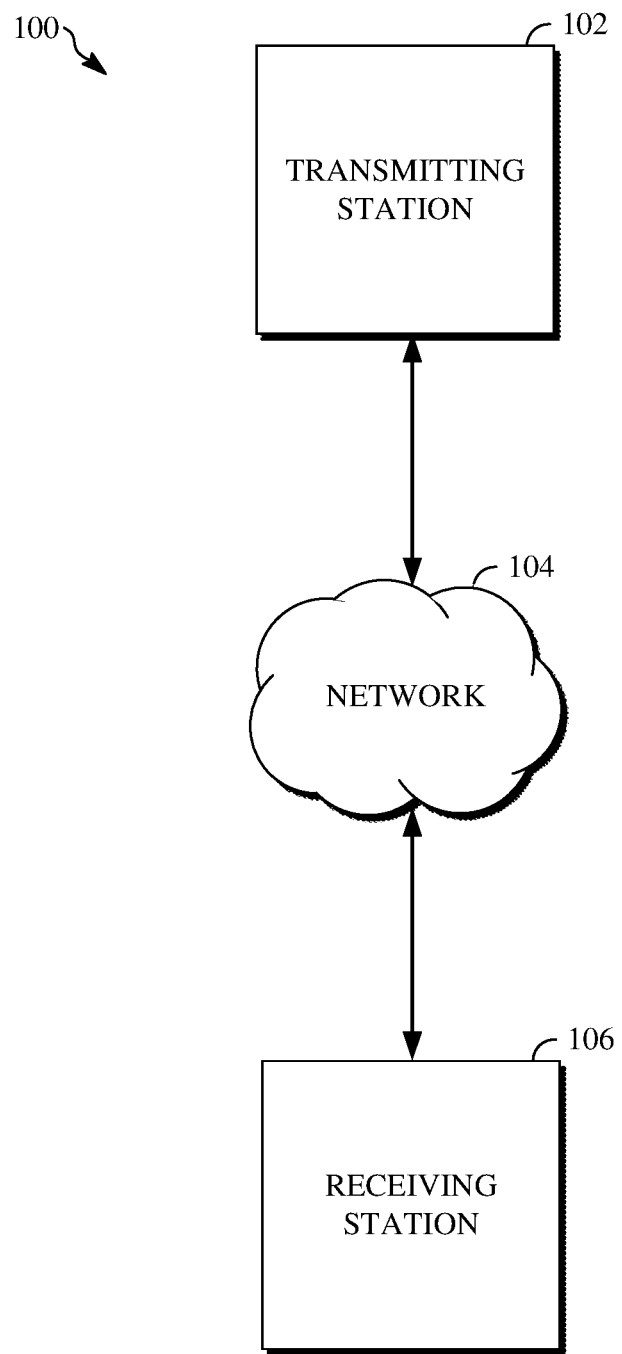
FIG. 1 is a schematic of an example of a video encoding and decoding system.

Video compression schemes may include breaking respective images, or frames, into smaller portions, such as blocks, and generating an encoded bitstream using techniques to limit the information included for respective blocks thereof. The encoded bitstream can be decoded to re-create the source images from the limited information. For example, a video compression scheme can include transforming the prediction residual block for a current video block into a transform block including a number of transform coefficients. The transform coefficients are quantized and entropy coded into an encoded bitstream. A decoder processes the encoded transform coefficients, including by inverse transformation, to decode or decompress the encoded bitstream to prepare the video stream for viewing or further processing.

The prediction residual block represents a difference between the original version of the current video block and a prediction block generated using a prediction source (e.g., another video block in a same video frame as the current video block or a video block in a different video frame of the video stream). The pixel values of the prediction residual block represent the information to actually encode to the bitstream for the current video block. The location of pixel values of a prediction residual block may vary based on several factors, for example, the underlying content of a given video block and the type of prediction used to generate the prediction residual block.

Conventional video codecs include functionality for partitioning a video block into one or more smaller sub-blocks, such as to enable the different processing of each of the sub-blocks based on the specific video data thereof. The partitioning of a video block into the one or more sub-blocks results in a different prediction residual block being generated for each of those sub-blocks, and thus a different transform block being used to transform the video data of each of those sub-blocks, in which each of those transform blocks is of a size corresponding to the size of the corresponding sub-block. In some such conventional video codecs, a recursive partitioning scheme may be used, such as for quadtree partitioning of a video block. A given quadtree is defined by one or more factors, such as a minimum available transform block size, a maximum available transform block size, and a maximum transform split depth. Regardless of the particular manner of video block partitioning, the partitioning may further be limited such as to certain shapes or sizes and/or based on the type of inter- or intra-prediction being performed.

However, these conventional partitioning schemes limit the potential coding gains available to an encoder and decoder in a few ways. First, where the partitioning is performed at the prediction-level and not at the transform-level, the codec is unable to efficiently target areas of a prediction residual which include high energy for transforming and instead potentially incurs a large computational expense in transforming the entire prediction residual for a given video block, regardless of the number of sub-blocks into which the video block is partitioned. Second, technical limitations prevent the application of certain partition types against certain block sizes, resulting in an inability to partition a prediction residual block in certain ways to efficiently target certain portions thereof in cases where the corresponding sub-block is already small. Third, the types of block partitioning available, such as which may be defined by the shapes and locations of sub-blocks resulting from the use thereof, may be limited by the technical abilities of the codec, such as by the inability of a codec to recognize or process partitions which do not conform to the already defined partitioning structure.

Previous attempts at implementing a transform-level partitioning scheme have used a recursive transform partitioning scheme for inter blocks. A recursive partitioning scheme is typically represented as a quadtree in which the leaves of the quadtree represent a final, partitioned block. However, while recursive partitioning schemes achieve certain benefits, they also suffer from certain drawbacks. In particular, the recursive splits can only produce square transform sizes, skewing the transform size selection towards square transforms. This prevents the encoder from searching rectangular transform sizes smaller than the prediction block, and foregoes the potential coding gains in cases where a small rectangular partition could have been beneficial. Furthermore, experimentation and testing has revealed that a recursion quadtree depth greater than two rarely has significant benefit. Given that more than half of the bitrate in modern codecs is still spend on coding a prediction residual, the use of a recursive transform-level partitioning scheme may limit the potential coding gains achieved by a different type of transform-level partitioning scheme.

Implementations of this disclosure address problems such as these by the transform-level partitioning of a prediction residual block using a selected transform block partition type. During encoding, a prediction residual block is generated responsive to prediction-level partitioning performed against a video block, a transform block partition type to use is determined based on the prediction residual block, a non-recursive transform-level partitioning is performed against the prediction residual block according to the transform block partition type, and transform blocks generated as a result of the transform-level partitioning are encoded to a bitstream. During decoding, a symbol representative of the transform block partition type used to encode transform blocks is derived from the bitstream, inverse transformed blocks are produced by inverse transforming encoded video data associated with the prediction residual block, and the prediction residual block is reproduced according to the transform block partition type and used to reconstruct the video block, which is output within an output video stream.

The partitioning introduced by the implementations of this disclosure represents partitioning performed at the transform-level. In some implementations, this may be in addition to other partitioning as may be performed at the prediction-level. In some implementations, this may be instead of such other partitioning as may be performed at the prediction-level. In either case, the transform-level partitioning schemes disclosed herein enable a video codec to further divide data associated with a given video block into different partitions based on the distribution of transform energy within a prediction residual. The extended transform partitioning introduced by this disclosure thus presents improved flexibility during encoding and decoding, such as by allowing encoders and decoders to more efficiently target areas of a prediction residual with high energy amounts and devote fewer computing resources to areas with lower energy amounts.

The use of the transform-level partition scheme disclosed herein achieves considerable coding gains due to the increased variability of possible transform sizes and incurs less computational overhead and memory consumption than in a recursive partitioning scheme. The transform-level partition scheme disclosed herein may be implemented for some or all inter- and intra-predicted video blocks of a video frame, and each such video block may be processed using the subset of partitions that its specific dimensions will support. The number of partitions available for smaller block sizes is also extended, such as over the partitions available in a conventional video codec, thereby enabling greater coding efficiency for smaller block sizes.

Further details of techniques for video coding using extended transform partitions are described herein with initial reference to a system in which such techniques can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
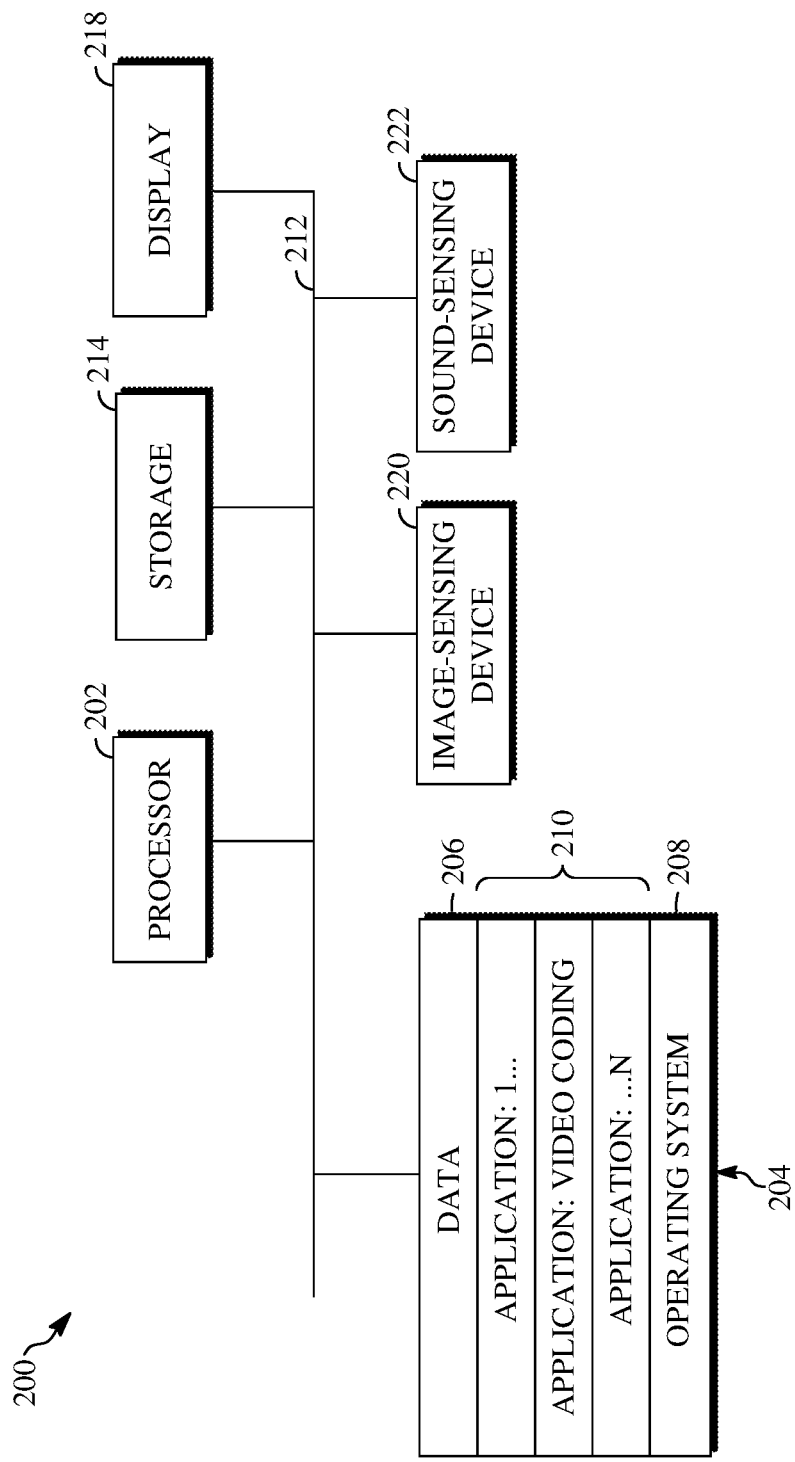
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a learning model training application and/or a video coding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
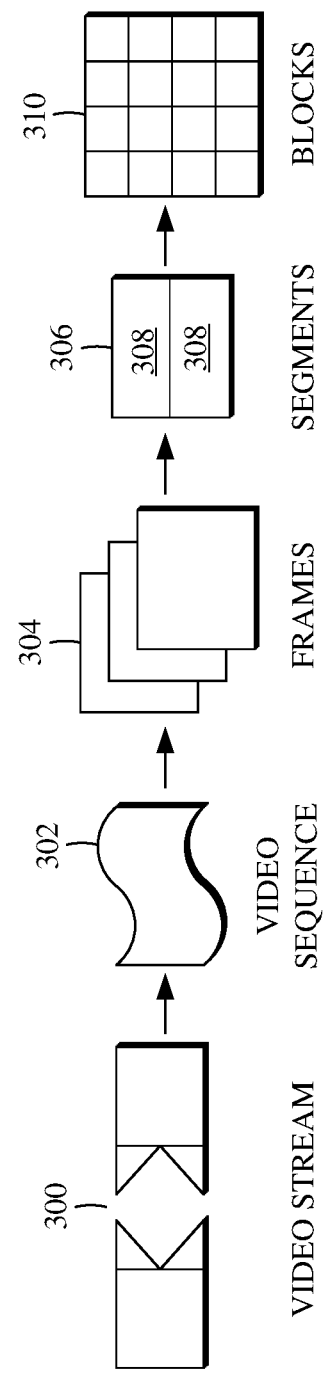
FIG. 3 is a diagram of an example of a video stream to be encoded and decoded.

FIG. 3 is a diagram of an example of a video stream 300 to be encoded and decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
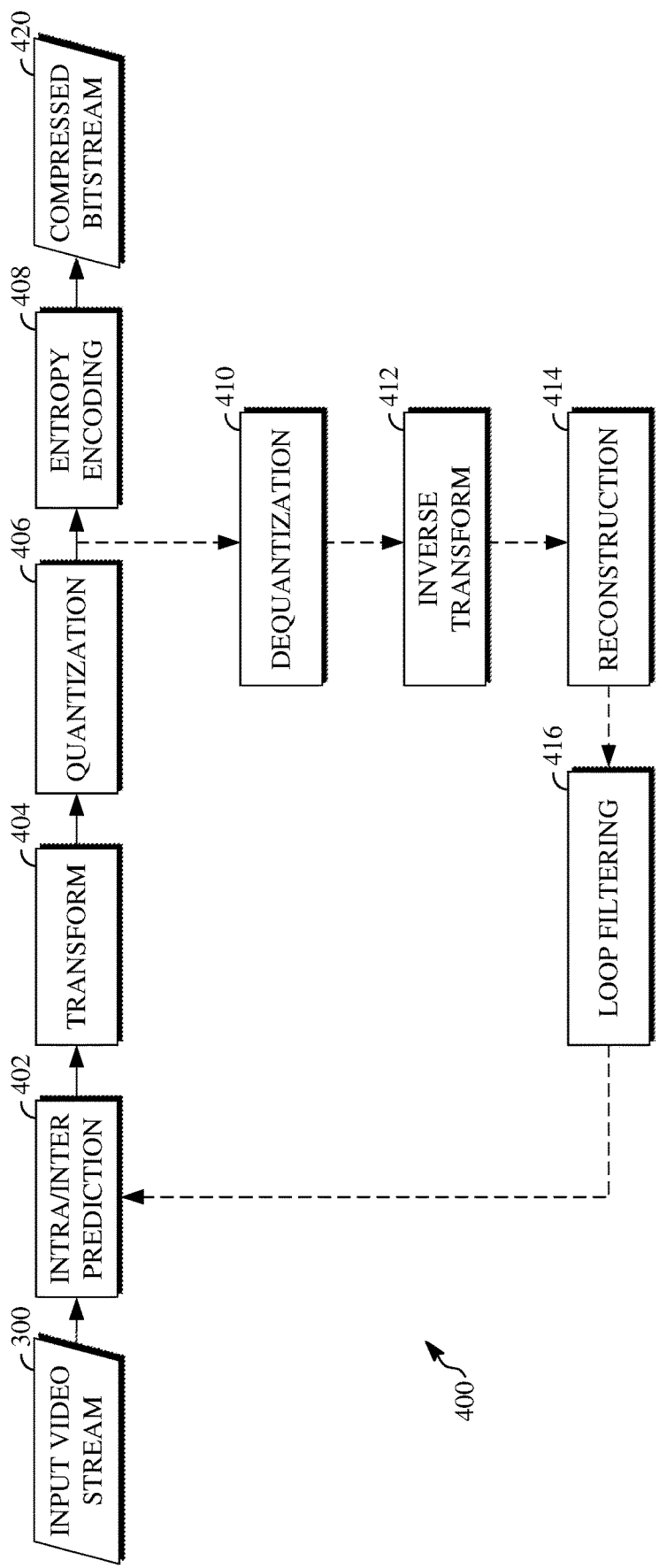
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In some implementations, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

In some cases, the functions performed by the encoder 400 may occur after a filtering of the video stream 300. That is, the video stream 300 may undergo pre-processing according to one or more implementations of this disclosure prior to the encoder 400 receiving the video stream 300. Alternatively, the encoder 400 may itself perform such pre-processing against the video stream 300 prior to proceeding to perform the functions described with respect to FIG. 4, such as prior to the processing of the video stream 300 at the intra/inter prediction stage 402.

When the video stream 300 is presented for encoding after the pre-processing is performed, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters which may be applied at the loop filtering stage 416 include, without limitation, a deblocking filter, a directional enhancement filter, and a loop restoration filter.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
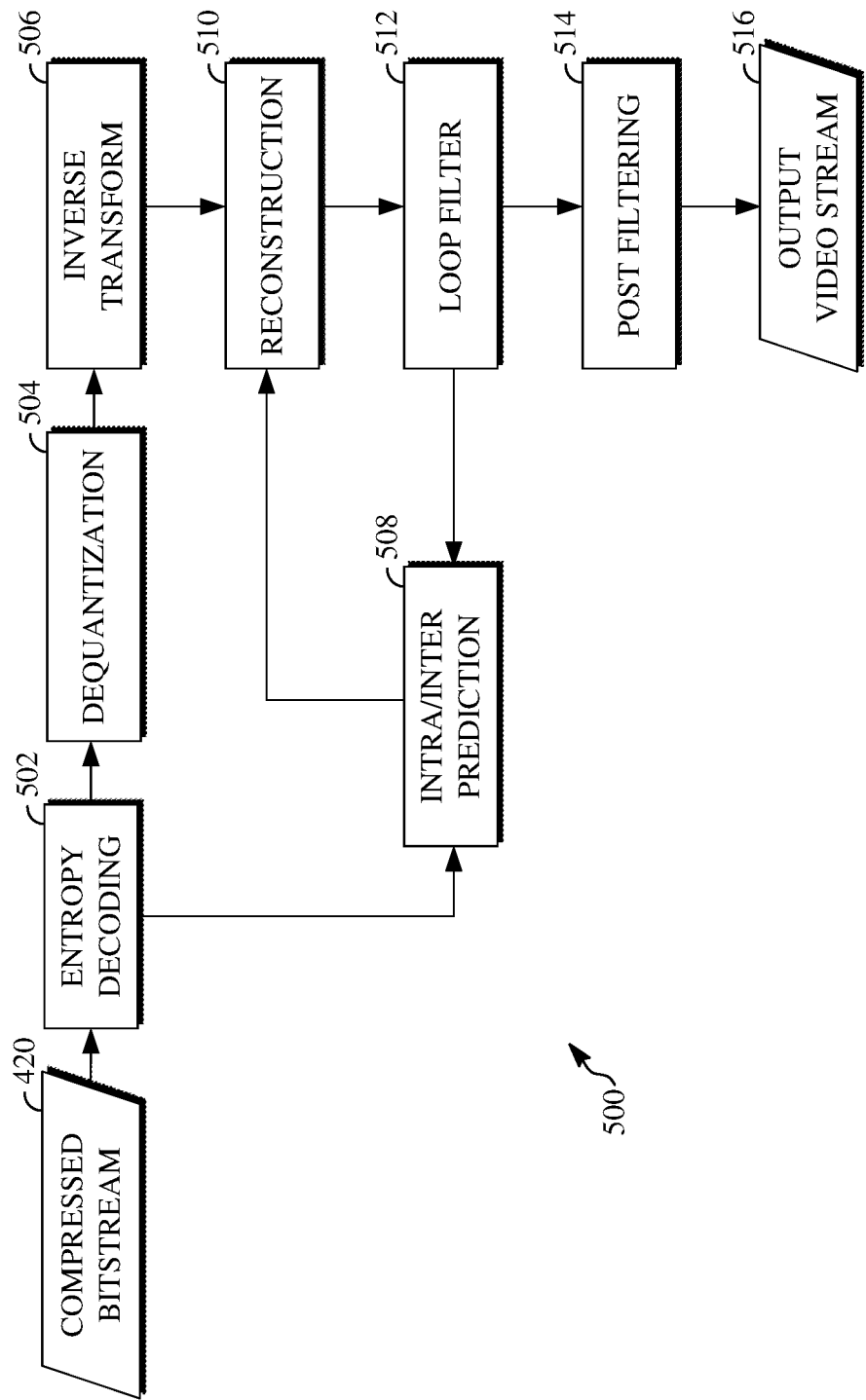
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106. In some implementations, the decoder 500 is a hardware decoder.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Examples of filters which may be applied at the loop filtering stage 512 include, without limitation, a deblocking filter, a directional enhancement filter, and a loop restoration filter. Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514 or otherwise omit the post filter stage 514.

Figure 6:
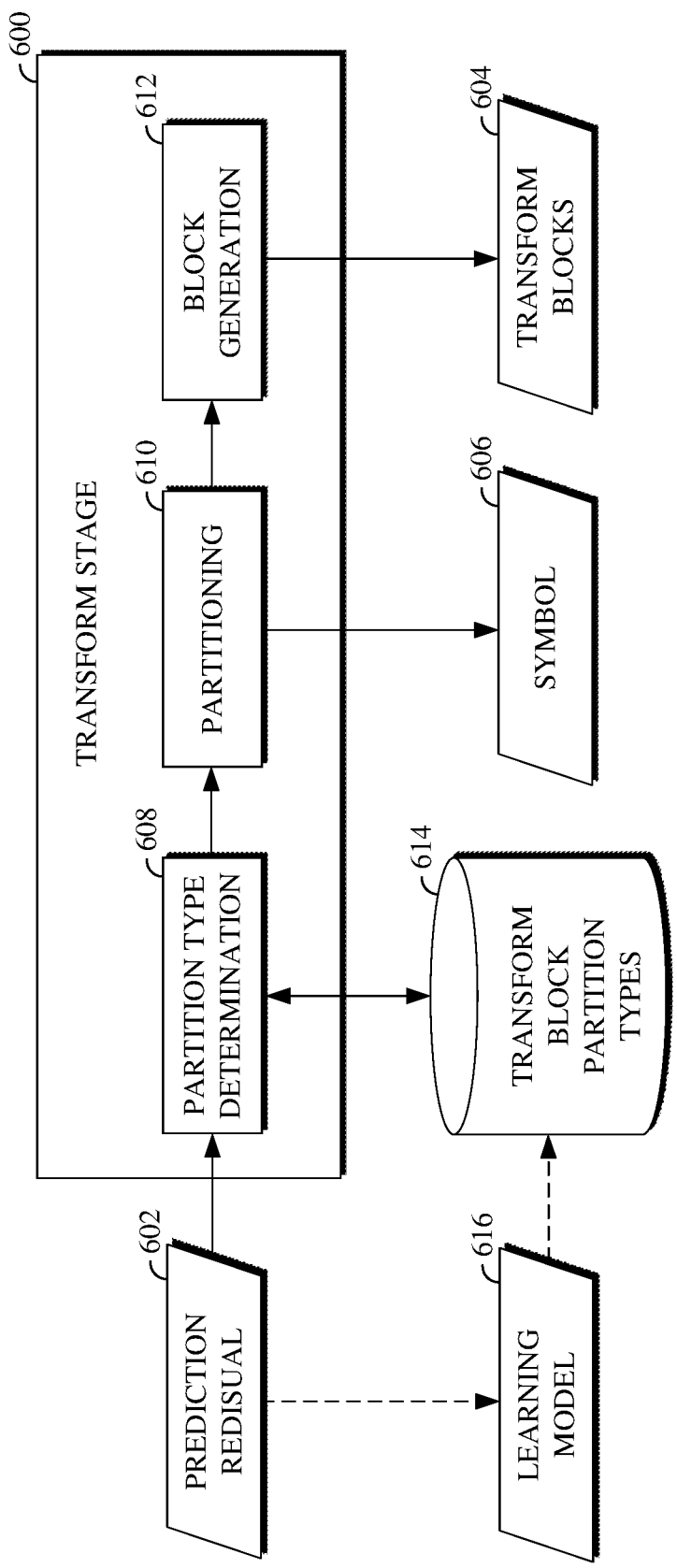
FIG. 6 is a block diagram of an example of a transform stage of an encoder.

FIG. 6 is a block diagram of an example of a transform stage 600 of an encoder. The transform stage 600 may, for example, be the transform stage 404 of the encoder 400 shown in FIG. 4. The transform stage 600 takes as input a prediction residual block 602 produced as output from a prediction stage (e.g., the intra/inter prediction stage 402 shown in FIG. 4) and produces as output a number of transform blocks 604 and a symbol 606 representative of a transform block partition type used at the transform stage 600 to produce the transform blocks 604. The prediction residual block 602 refers to the block structure which contains the prediction residual computed at the prediction stage. The prediction residual block 602 has a same size as the video block from which the prediction residual 602 was predicted.

The transform stage 600 includes a transform-level partition type determination stage 608 a transform-level partitioning stage 610, and a transform block generation stage 612. The transform-level partition type determination stage 608 uses the prediction residual block 602 to determine a transform block partition type 614 for performing transform-level partitioning against the prediction residual block 602. The transform-level partitioning stage 610 partitions the prediction residual block 602 into some number of sub-blocks according to the transform block partition type 614 determined at the transform-level partition type determination stage 608. The transform block generation stage 612 generates the transform blocks 604, in which one of the transform blocks 604 is generated for each of the sub-blocks into which the prediction residual block 602 was partitioned at the transform-level partitioning stage 610, and in which each of the transform blocks 604 has a size defined by the transform block partition type 614.

The transform block partition types 614 indicate varying shapes and numbers of transform blocks into which the prediction residual 602 may be partitioned based on the distribution of video data within the prediction residual block 800. There may be a number of transform block partition types 614 available for partitioning the prediction residual block 602 into one or more sub-blocks. Information representative of the transform block partition types 614 may be locally stored, such as at a computing device used to perform the functionality of the transform stage 600.

The transform-level partitioning to be performed using the transform block partition type 614 determined by the transform-level partition type determination stage 608 is distinct from prediction-level partitioning performed as part of the process for producing the prediction residual block 602. Whereas the prediction-level partitioning is performed to partition a video block of input pixel values into some number of sub-blocks which are then predicted and for which a prediction residual is computed, the transform-level partitioning is performed to partition the block of the prediction residual computed as a result of the prediction into some number of sub-blocks which are then transformed.

The symbol 606 and the transform blocks 604 are encoded to a bitstream, for example, the compressed bitstream 420 shown in FIGS. 4 and 5. For example, the symbol 606 and the transform blocks 604 may be output from the transform stage 600 and received at an entropy coding stage of the encoder. The entropy coding stage entropy codes the transform blocks 604 and the symbol 606 into entropy coded values, which values may then be encoded to the bitstream.

Although the symbol 606 is shown as being the output of the transform-level partitioning stage 610, in some implementations, the symbol 606 may be output from a different part of the transform stage 600. For example, the symbol 606 may be output from the transform-level partition type determination stage 608, such as after a determination to use the transform block partition type represented by the symbol 606. In another example, the symbol 606 may be output from the transform block generation stage 612, such as along with the transform blocks 604.

In some implementations, a learning model 616 may be used as part of the process for determining the transform block partition type 614 to use for partitioning the prediction residual block 602. For example, the learning model 616 may be trained to determine to exclude one or more of the transform block partition types 614 from evaluation at the transform-level partition type determination stage 608. For example, the learning model 616 may be trained to recognize transform sizes which are not useful for encoding particular prediction residual data. The learning model 616 may be trained to do so using a training data set including prediction residual data values and sizes, numbers and sizes of transform blocks into which the prediction residual data are partitioned, and bitstream information representing the data requirement for encoding those transform blocks.

In such an implementation, the learning model 616 may determine to exclude one or more of the transform block partition types 614 based on video data within the prediction residual block 602, the size of the prediction residual block 602, or other information associated with the prediction residual block 602. For example, the learning model 616 may be determine to exclude transform block partition types which, if used, would result in transform blocks having a size determined to be not useful for encoding the data included in the prediction residual block 602. In such an implementation, the transform block partition type 614 ultimately determined for use in the transform-level partitioning is other than one of the excluded one or more transform block partition types.

As used herein, the learning model 616 may be a machine learning model. For example, the machine learning model may be or include one or more of a neural network (e.g., a convolutional neural network, recurrent neural network, or other neural network), decision tree, support vector machine, Bayesian network, genetic algorithm, deep learning system separate from a neural network, or other machine learning model. In some cases, the machine learning model may be of an unconventional structure or otherwise demonstrate unconventional functionality.

Figure 7:
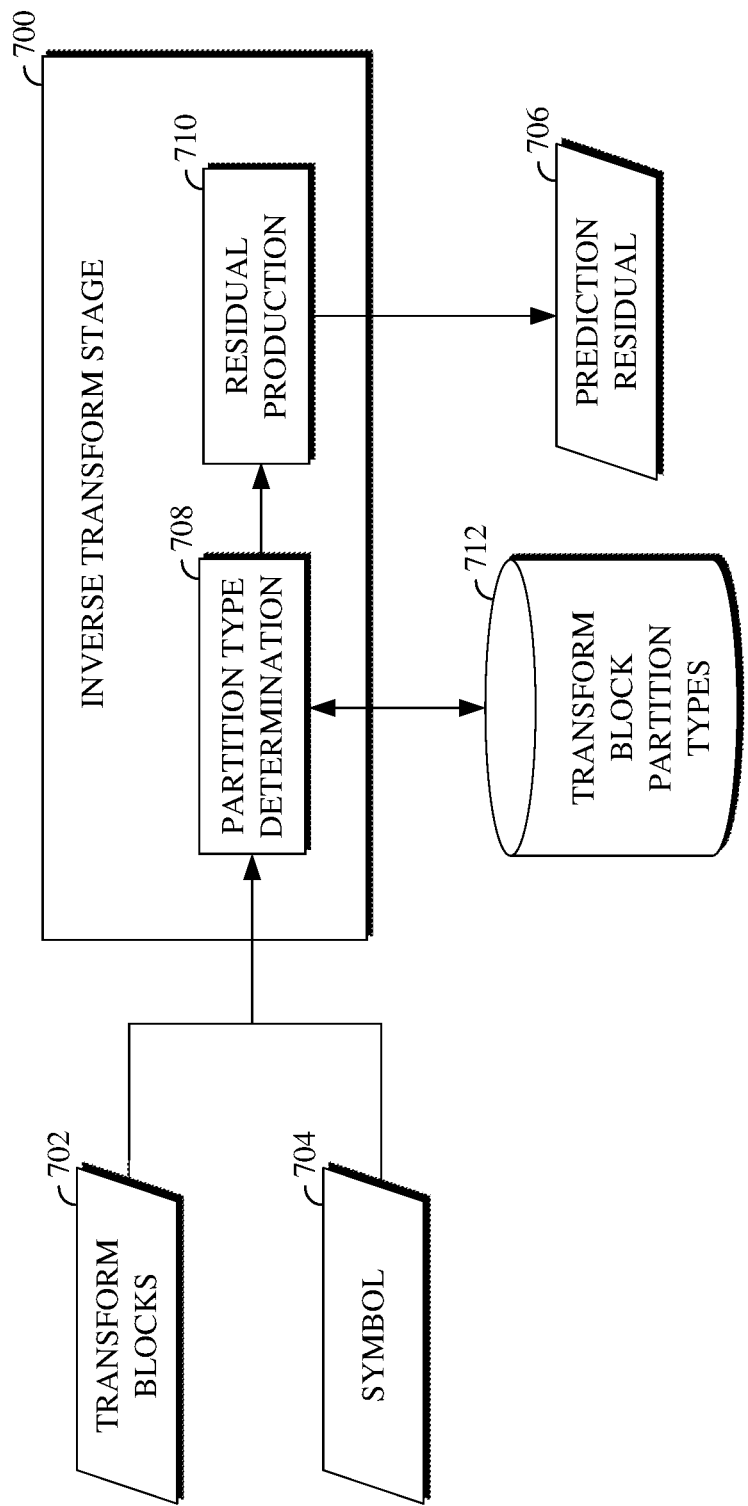
FIG. 7 is a block diagram of an example of an inverse transform stage of a decoder.

FIG. 7 is a block diagram of an example of an inverse transform stage 700 of a decoder. The inverse transform stage 700 may, for example, be the inverse transform stage 506 of the decoder 500 shown in FIG. 5. The inverse transform stage 700 receives as input transform blocks 702, such as which may be output after dequantization during decoding, and a symbol 704 representative of a transform block partition type used in connection with the encoding of the transform blocks 702, such as described above with respect to the transform stage 600 shown in FIG. 6. For example, the transform blocks 702 and the symbol 704 may respectively be or otherwise correspond to the transform blocks 604 and the symbol 606 shown in FIG. 6. The inverse transform stage 700 outputs a prediction residual block 706, which may, for example, be or otherwise correspond to the prediction residual block 602 shown in FIG. 6.

The inverse transform stage 700 includes a transform block partition type determination stage 708 and a prediction residual block production stage 710. The transform block partition type determination stage 708 parses the symbol 704 to determine the transform block partition type 712 which was used during the encoding of the transform blocks 702, such as to partition a prediction residual block during transform-level partitioning into one or more sub-blocks and which were then transformed to produce transform blocks.

There may be a number of transform block partition types 712 available at the encoder for partitioning the prediction residual block into the one or more sub-blocks. Each of the transform block partition types 712 can be identified based on the entropy-coded value of the symbol 704. Information representative of the transform block partition types 712 may be locally stored, such as at a computing device used to perform the functionality of the inverse transform stage 700. Alternatively, information representative of the transform block partition types 712 may be communicated within the bitstream which includes the transform blocks 702 and the symbol 704.

The prediction residual block production stage 710 inverse transforms the transform blocks 702 and produces the prediction residual block 706 according to the transform block partition type 712 determined at the transform block partition type determination stage 708. For example, after inverse transforming each of the transform blocks 702, the prediction residual block production stage 710 may combine the inverse transformed blocks arranged according to the arrangement set forth in the transform block partition type 712 to produce the prediction residual block 706. The prediction residual block 706 is then output for further processing, such as at a prediction stage of the decoder which uses the prediction residual block 706 to reconstruct a video block.

Although the transform blocks 702 are shown as being received at the transform block partition type determination stage 708, in some implementations, the transform blocks 702 may instead be received at the prediction residual block production stage 710. For example, where the transform blocks 702 are received at the transform block partition type determination stage 708, the transform block partition type determination stage 708 may simply operate as a pass through to provide the information about the transform blocks 702 to the prediction residual block production stage 710. However, instead, the transform block partition type determination stage 708 may not receive the transform blocks 702 at all, and the transform blocks 702 may instead be received (e.g., as output of a dequantization stage of the decoder) directly at the prediction residual block production stage 710.

Figure 8:
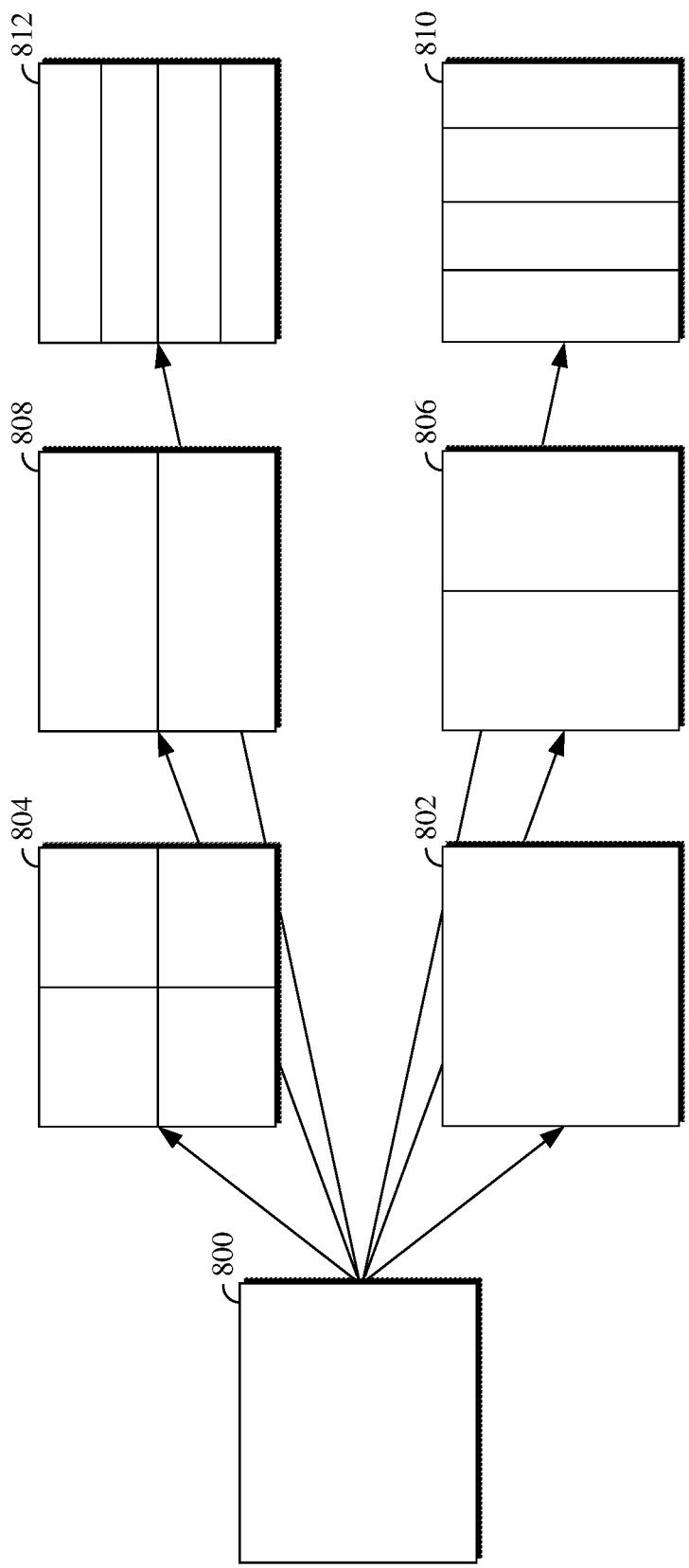
FIG. 8 is an illustration of examples of transform block partition types available for partitioning a prediction residual block.

FIG. 8 is an illustration of examples of transform block partition types available for partitioning a prediction residual block 800, which may, for example, be the prediction residual block 602 shown in FIG. 6. The transform block partition types indicate varying shapes and numbers of transform blocks into which the prediction residual block 800 may be partitioned based on the distribution of video data within the prediction residual block 800.

The use of a first transform block partition type 802 does not result in a partitioning of the prediction residual block 800. The use of the first transform block partition type 802 thus results in a single transform block which covers the entire prediction residual block 800.

The use of a second transform block partition type 804 results in a four-way partitioning of the prediction residual block 800. The use of the second transform block partition type 804 thus results in four equally sized transform blocks which each cover one fourth of the prediction residual block 800.

The use of a third transform block partition type 806 results in a two-way vertical partitioning of the prediction residual block 800. The use of the third transform block partition type 806 thus results in two equally sized transform blocks in which one covers the left portion of the prediction residual block 800 and the other covers the right portion of the prediction residual block 800.

The use of a fourth transform block partition type 808 results in a two-way horizontal partitioning of the prediction residual block 800. The use of the fourth transform block partition type 808 thus results in two equally sized transform blocks in which one covers the top portion of the prediction residual block 800 and the other covers the bottom portion of the prediction residual block 800.

The use of a fifth transform block partition type 810 results in a four-way vertical partitioning of the prediction residual block 800. The use of the fifth transform block partition type 810 thus results in four equally sized transform blocks in which one covers the leftmost portion of the prediction residual block 800, one covers the left-center portion of the prediction residual block 800, one covers the right-center portion of the prediction residual block 800, and the other covers the rightmost portion of the prediction residual block 800.

The use of a sixth transform block partition type 812 results in a four-way horizontal partitioning of the prediction residual block 800. The use of the sixth transform block partition type 812 thus results in four equally sized transform blocks in which one covers the topmost portion of the prediction residual block 800, one covers the top-center portion of the prediction residual block 800, one covers the bottom-center portion of the prediction residual block 800, and the other covers the bottommost portion of the prediction residual block 800.

In some implementations, transform block partition types other than those described above may be used in addition to or instead of those described above. Examples of such other transform block partition types include, but are not limited to, a three vertical strip partition in which a vertical strip centrally located in the prediction block is larger than each of the two vertical strips on the left and right sides of the prediction block, a three horizontal strip partition in which a horizontal strip centrally located in the prediction block is larger than each of the two horizontal strips on the top and bottom of the prediction block, and a T-shaped partition in which two of the three resulting transform blocks are of equal size and smaller than the third.

Figure 9:
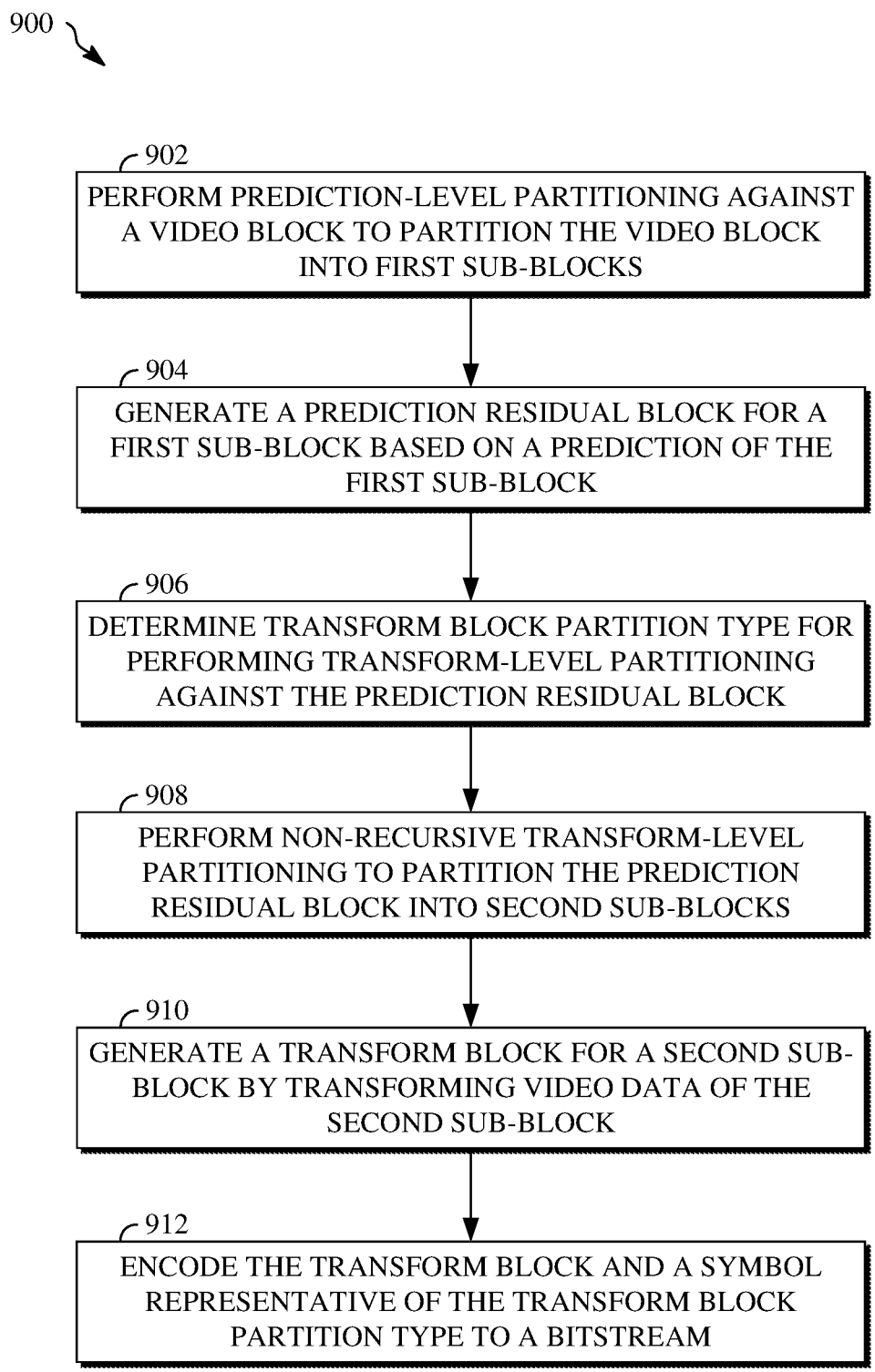
FIG. 9 is a flowchart diagram of an example of a technique for encoding a video block using extended transform partitions.
Figure 10:
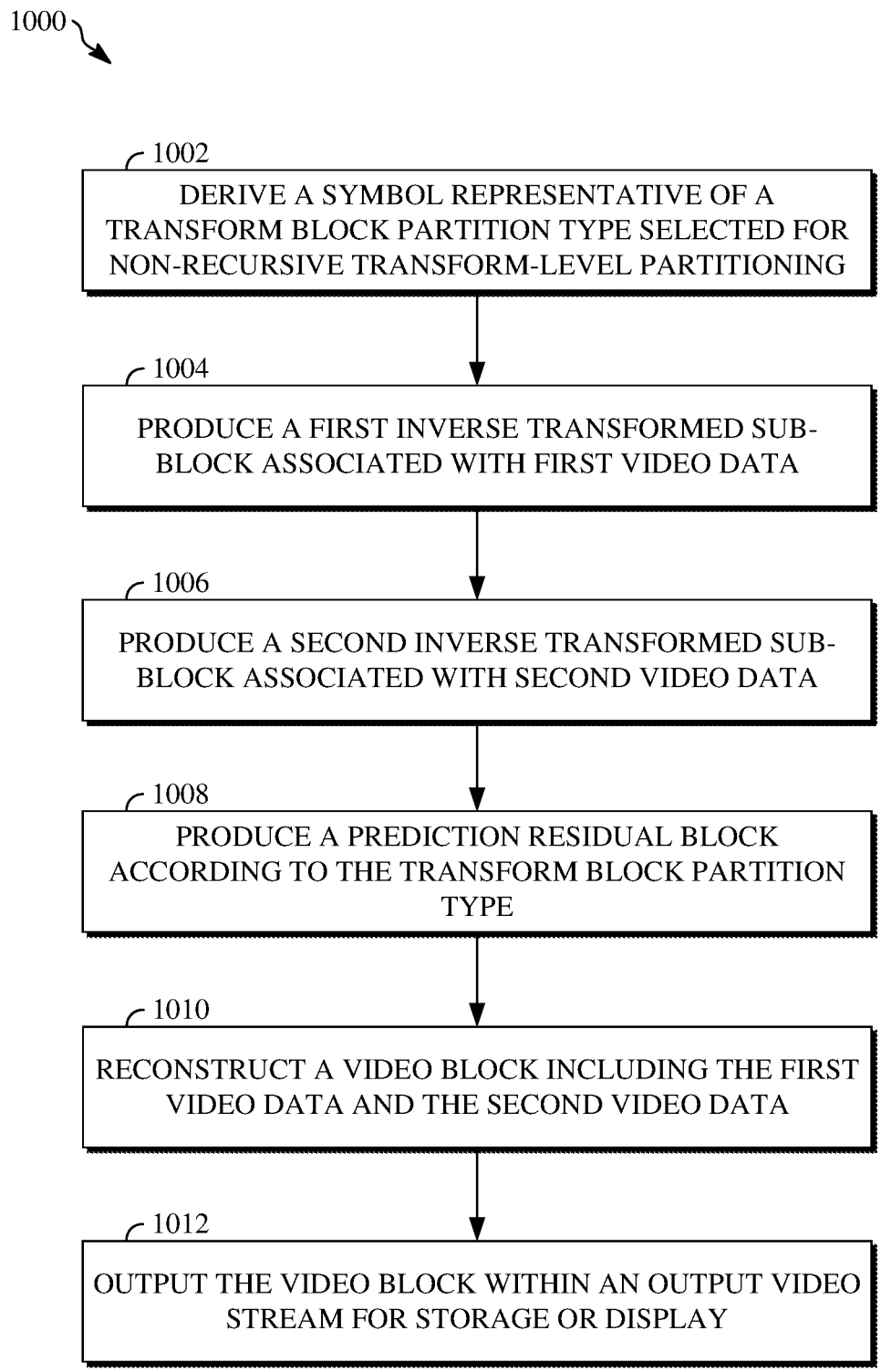
FIG. 10 is a flowchart diagram of an example of a technique for decoding an encoded video block using extended transform partitions.

Further details of techniques for video coding using extended transform partitions are now described. FIG. 9 is a flowchart diagram of an example of a technique 900 for encoding a video block using extended transform partitions. FIG. 10 is a flowchart diagram of an example of a technique 1000 for decoding an encoded video block using extended transform partitions.

The technique 900 and/or the technique 1000 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 900 and/or the technique 1000. The technique 900 and/or the technique 1000 can be implemented using specialized hardware or firmware. For example, a hardware component configured to perform the technique 900 and/or the technique 1000. As explained above, some computing devices may have multiple memories or processors, and the operations described in the technique 900 and/or the technique 1000 can be distributed using multiple processors, memories, or both.

For simplicity of explanation, the techniques 900 and 1000 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 9, the technique 900 for encoding a video block using extended transform partitions is shown. At 902, prediction-level partitioning is performed against the video block to partition the video block into one or more first sub-blocks. The video block is a block of input pixels of a video frame, such as which may be included in an input video stream, such as the input video stream 300 shown in FIG. 4.

At 904, a prediction residual block is generated for a first sub-block of the one or more first sub-blocks. The prediction residual block is generated based on a prediction of the first sub-block. Generating the prediction residual block includes predicting (e.g., using an intra-prediction mode or an inter-prediction mode) the video data of the first sub-block using some reference block to compute a prediction residual for the first sub-block, in which the prediction residual represents a differential between the first sub-block and the reference block. The prediction residual block is a block of size M×N containing the prediction residual, in which M and N may be the same integer value or different integer values.

At 906, a transform block partition type for perform transform-level partitioning against the prediction residual block is determined. The transform block partition type is one of multiple transform block partition types available for partitioning the prediction residual block. Examples of transform block partition types which may be used to perform the transform-level partitioning against the prediction residual block include, but are not limited to, those shown in FIG. 8.

Determining a transform block partition type for performing the transform-level partitioning against the prediction residual block includes evaluating the available transform block partition types using a rate-distortion scheme. For example, rate-distortion values resulting from partitioning the prediction residual block using each of the transform block partition types may be computed. A lowest one of those rate-distortion values, representing a greatest rate-distortion advantage amongst the transform block partition types, may be identified, and the transform block partition type corresponding to that lowest rate-distortion value may be selected, identified, or otherwise determined for use for the transform-level partitioning.

In that the transform block partition type to use will be applied at the transform-level against already produced prediction residual information, the determination of the transform block partition type to use does not depend upon the prediction mode used to produce the prediction residual information. Thus, the use of a given transform block partition type to perform transform-level partitioning against the prediction residual block is independent of whether the prediction of the first sub-block, resulting in the prediction residual block, uses an intra-prediction mode or an inter-prediction mode.

The determination of a given transform block partition type for performing the transform-level partitioning against the prediction residual block also takes into consideration the size of the transform blocks which would result from such partitioning of the prediction residual block. That is, the prediction residual block is understood to be of size M×N, in which M and N may be the same integer value or different integer values. The transform blocks which will result from the transform-level partitioning of the prediction residual block and the transforming of the prediction residual data in each partitioned sub-block are understood to be of size (M/X)×(N/Y), in which X and Y may be the same integer value or different integer values.

For example, referring to FIG. 8, where the prediction residual block 800 is of size 64×64, the use of the second transform block partition type 804 will result in four transform blocks each of size (64/2)×(64×2), or 32×32, or the use of the fifth transform block partition type 810 will result in four transform blocks each of size (64/4)×(64/1), or 16×64. In another example, still referring to FIG. 8, where the prediction residual block 800 is of size 32×16, the use of the second transform block partition type 804 will result in four transform blocks each of size (32/2)×(16×2), or 16×8, or the use of the fifth transform block partition type 810 will result in four transform blocks each of size (32/4)×(16/1), or 8×16.

In some cases, the determination to use or not use a given transform block partition type may be based on the size of the transform blocks which would result from the partitioning of the prediction residual block using that given transform block partition type. For example, if the prediction residual block is of size 8×8, it may not be useful for the sake of improving compression performance, and it may even be impossible in some cases due to encoder limitations, to partition the prediction residual block using the fifth transform block partition type 810 shown in FIG. 8 or the sixth transform block partition type 812 shown in FIG. 8. This is because the resulting transform blocks would respectively be of size 2×8 or 8×2. Alternatively, if the prediction residual block is of size 128×128, the use of the first transform block partition type 802 would result in a transform block of size 128×128, which may not be useful to improve compression performance and may, subject to encoder limitations, may even be unusable by the encoder altogether.

At 908, a non-recursive transform-level partitioning is performed against the prediction residual block using the transform block partition type to partition the prediction residual block into one or more second sub-blocks. For example, the prediction residual block may be partitioned into a plurality of second sub-blocks. The transform-level partitioning is performed a single time to partition the prediction residual block into the second sub-blocks. The prediction residual block may be partitioned into up to four second sub-blocks, wherein each of the up to four second sub-blocks corresponds to at least one fourth of video data of the prediction residual block. In at least some cases, a shape of each of the second sub-blocks may be different than a shape of the prediction residual block, for example, as shown with respect to the examples shown in FIG. 8.

At 910, a transform block is generated for a second sub-block of the second sub-blocks by transforming video data of the second sub-block. The transform block generated for a second sub-block is of the same size as the second sub-block. The transform block generated for the second sub-block may be of conventional sizes as may be known for transform blocks. However, implementations of this disclosure further extend available transform block sizes beyond conventional sizes. Accordingly, according to this disclosure, the transform block generated for the second sub-block may, for example, and without limitation, have a size equal to one of 4×64, 64×4, 4×32, 32×4, 8×64, or 64×8. The new transform block sizes may be available for the transform blocks produced from the prediction residual block based on the of transform block partition type used for the transform-level partitioning and based on the size of the prediction residual block.

At 912, the transform block and a symbol representative of the transform block partition type are encoded to a bitstream. The transform block may be one of a number of transform blocks encoded to the bitstream to represent the video block in an encoded form. For example, a different transform block may be generated for each of the second sub-blocks, and each of those transform blocks may be encoded to the bitstream along with the symbol.

The symbol representative of the transform block partition type used for the transform-level partitioning is encoded within the bitstream to signal the selection of that transform block partition type to a decoder which later receives and decodes the encoded video block from the bitstream. The symbol may, for example, be encoded within a block header, slice header, tile header, or frame header associated with the video block.

The symbol representative of the transform block partition type is an entropy coded symbol defined to uniquely represent the transform block partition type. For example, each of the transform block partition types available for encoding and decoding video data may be associated with a different entropy coded symbol for signaling within the bitstream. In such a case, each of a number of entropy coded symbols may be defined to uniquely signal one of the transform block partition types within the bitstream.

For example, the selection or other use of each of the first transform block partition type 802, the second transform block partition type 804, the third transform block partition type 806, the fourth transform block partition type 808, the fifth transform block partition type 810, and the sixth transform block partition type 812 shown in FIG. 8 may be represented in the bitstream using a different entropy coded symbol. In such an implementation, a decoder which receives the bitstream can decode an entropy coded symbol to determine the specific transform block partition type used at the encoder.

The technique 900 may be performed for each prediction residual block to encode. In particular, each prediction residual block may be encoded using the same transform block partition type or using different transform block partition types. For example, referring to the prediction residual block described above with respect to the technique 900 as a first prediction residual block, a second prediction residual block may now be generated for another first sub-block of the one or more first sub-blocks based on a prediction of the other first sub-block.

A transform block partition type for performing transform-level partitioning against the second prediction residual block is then determined, such as in the same way in which the transform block partition type for the first prediction residual block was determined. The transform block partition type determined for the second prediction residual block may be the same as the transform block partition type determined for the first prediction residual block. Alternatively, the transform block partition type determined for the second prediction residual block may be different from the transform block partition type determined for the first prediction residual block.

A single, non-recursive transform-level partitioning is then performed against the second prediction residual block using the transform block partition type determined therefor to partition the second prediction residual block into one or more (e.g., a plurality of) other second sub-blocks. A second transform block for another second sub-block of the other second sub-blocks is then generated by transforming video data of the other second sub-block.

The second transform block and a symbol representative of the transform block partition type used to produce same are then encoded to the bitstream. Where the transform block partition type determined for the second prediction residual block is different from the transform block partition type determined for the first prediction residual block, the symbol representative of the transform block partition type determined for the second prediction residual block is different than the symbol representative of the transform block partition type determined for the first prediction residual block.

In some implementations, determining the transform block partition type for performing the transform-level partitioning against the prediction residual block may include using a learning model to determine to exclude one or more transform block partition types of the multiple transform block partition types from evaluation. For example, the learning model, which may, for example, be the learning model 616 shown in FIG. 6, may be trained to recognize transform sizes which are not useful for encoding particular prediction residual data. The learning model may be trained to do so using a training data set including prediction residual data values and sizes, numbers and sizes of transform blocks into which the prediction residual data are partitioned, and bitstream information representing the data requirement for encoding those transform blocks.

In such an implementation, the learning model may determine to exclude the one or more transform block partition types based on the prediction residual block, such as based on the video data within the prediction residual block, the size of the prediction residual block, or other information associated with the prediction residual block. For example, the learning model may be determine to exclude transform block partition types which, if used, would result in transform blocks having a size determined to be not useful for encoding the data included in the prediction residual block. In such an implementation, the transform block partition type ultimately determined for use in the transform-level partitioning is other than one of the excluded one or more transform block partition types.

In some implementations, the transform block partition types available for the transform-level partitioning of the prediction residual block may be limited based on the size of the prediction residual block. For example, referring to the six examples of transform block partition types shown in FIG. 8, where the prediction residual block is of size 8×8, the transform block partition types available for the transform-level partitioning of the prediction residual block may be limited to the first transform block partition type 802, the second transform block partition type 804, the third transform block partition type 806, and the fourth transform block partition type 808. Thus, in such a case, the fifth transform block partition type and the sixth transform block partition type 812 would be excluded from evaluation.

Referring next to FIG. 10, the technique 1000 for decoding an encoded video block using extended transform partitions is shown. At 1002, a symbol is derived from a bitstream to which the encoded video block is encoded. The symbol represents a transform block partition type used for non-recursive transform-level partitioning of a prediction residual block encoded to produce the encoded video block. The selection of the transform block partition type used for the transform-level partitioning of the prediction residual block is performed at an encoder as described, for example, with respect to the technique 900 shown in FIG. 9.

At 1004, a first inverse transformed block is produced by inverse transforming a first encoded transform sub-block associated with first video data of the prediction residual block. At 1006, a second inverse transformed block is produced by inverse transforming a second encoded transform sub-block associated with second video data of the prediction residual block. The first inverse transformed block corresponds to at least one fourth of the first video data and the second inverse transformed block corresponds to at least one fourth of the second video data.

Each of the first inverse transformed block and the second inverse transformed block has a size which may be a conventional size known for transform blocks. Alternatively, each of the first inverse transformed block and the second inverse transformed block may have a size which is made available by the implementations of this disclosure. For example, and without limitation, each of the first inverse transformed blocks and the second inverse transformed block may have a size equal to one of 4×64, 64×4, 4×32, 32×4, 8×64, or 64×8. In at least some cases, a shape of each of the first inverse transformed block and the second inverse transformed block is different than a shape of the prediction residual block, for example, as shown with respect to the examples shown in FIG. 8.

At 1008, the prediction residual block is produced using the first inverse transformed block and the second inverse transformed block. Producing the prediction residual block using the first inverse transformed block and the second inverse transformed block includes combining the first inverse transformed block and the second inverse transformed block according to the transform block partition type represented by the symbol derived from the bitstream. For example, combining the first inverse transformed block and the second inverse transformed block may include arranging the first inverse transformed block and the second inverse transformed block according to the transform block partition type represented by the symbol.

At 1010, reconstructing a video block including the first video data and the second video data using the prediction residual block. Reconstructing the video block includes using a prediction for the prediction residual block to reconstruct the prediction residual block into the video block. The prediction is determined using an intra-prediction mode or an inter-prediction mode using some reference block.

At 1012, the video block is output within an output video stream for storage or display. For example, the video block may be included in a video frame output within the output video stream, such as the output video stream 516 shown in FIG. 5.

The technique 1000 may be performed for each prediction residual block to decode, in which up to four transform blocks correspond to a single prediction residual block. In particular, during encoding, each prediction residual block may be encoded using the same transform block partition type or using different transform block partition types. As a result, each of the up to four transform blocks which corresponds to a given prediction residual block is decoded according to one transform block partition type, but a second up to four transform blocks which correspond to a different prediction residual block may be decoded according to another transform block partition type.

For example, referring to the prediction residual block described above with respect to the technique 1000 as a first prediction residual block and the symbol corresponding to the first prediction residual block as a first symbol, a second symbol may be derived from the bitstream, which second symbol represents a transform block partition type used for non-recursive transform-level partitioning of a second prediction residual block encoded to produce the same encoded video block. One or more inverse transformed blocks are produced by inverse transforming video data associated with the second prediction residual block. The second prediction residual block block is then produced using the inverse transformed blocks and according to the transform block partition type represented by the second symbol. The reconstruction of the video block using the first prediction residual block is thus instead performed using the first prediction residual block and the second prediction residual block.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400, the decoder 500, and the transcoder 600, or another encoder, decoder, or transcoder as disclosed herein) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102 can encode content into an encoded video signal and transmit the encoded video signal to the communications device. In turn, the communications device can then decode the encoded video signal. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for encoding a video block, the method comprising:
   performing prediction-level partitioning against the video block to partition the video block into one or more first sub-blocks;
   generating a prediction residual block for a first sub-block of the one or more first sub-blocks based on a prediction of the first sub-block;
   determining a transform block partition type for performing transform-level partitioning against the prediction residual block, wherein the transform block partition type is one of multiple transform block partition types available for partitioning the prediction residual block;
   limiting transform-level partitioning performance to a single, non-recursive transform-level partitioning against the prediction residual block using the transform block partition type to partition the prediction residual block into a plurality of second sub-blocks;
   generating a transform block for a second sub-block of the plurality of second sub-blocks by transforming video data of the second sub-block; and
   encoding the transform block and a symbol representative of the transform block partition type to a bitstream.

2. The method of claim 1, wherein the prediction residual block is a first prediction residual block, the transform block partition type is a first transform block partition type, and the transform block is a first transform block, and wherein the method further comprises:

generating a second prediction residual block for another first sub-block of the one or more first sub-blocks based on a prediction of the other first sub-block;

determining a second transform block partition type for performing transform-level partitioning against the second prediction residual block, wherein the second transform block partition type is one of the multiple transform block partition types and is different than the first transform block partition type;

performing a single, non-recursive transform-level partitioning against the second prediction residual block using the second transform block partition type to partition the second prediction residual block into a plurality of other second sub-blocks;

generating a second transform block for another second sub-block of the plurality of other second sub-blocks by transforming video data of the other second sub-block; and encoding the second transform block and a symbol representative of the second transform block partition type to a bitstream, wherein the symbol representative of the second transform block partition type is different than the symbol representative of the first transform block partition type.

3. The method of claim 1, wherein a shape of each second sub-block of the plurality of second sub-blocks is different than a shape of the prediction residual block.

4. The method of claim 1, wherein determining the transform block partition type for performing the transform-level partitioning against the prediction residual block comprises:

using a learning model to determine, based on the prediction residual block, to exclude one or more transform block partition types of the multiple transform block partition types from evaluation, wherein the transform block partition type is other than one of the excluded one or more transform block partition types.

5. The method of claim 1, wherein the symbol representative of the transform block partition type is an entropy coded symbol defined to uniquely represent the transform block partition type.

6. The method of claim 1, wherein the transform block generated for the second sub-block has a size equal to one of 4×64, 64×4, 4×32, 32×4, 8×64, or 64×8.

7. The method of claim 1, wherein the plurality of second sub-blocks includes up to four second sub-blocks, wherein each of the up to four second sub-blocks corresponds to at least one fourth of video data of the prediction residual block.

8. The method of claim 1, wherein one or more transform block partition types of the multiple transform block partition types are excluded from evaluation based on a size of the prediction residual block.

9. A method for decoding an encoded video block from a bitstream, the method comprising:

deriving a first symbol and a second symbol from the bitstream, the first symbol representing a first transform block partition type used during a transform-level partitioning performance limited to a single, non-recursive transform-level partitioning of a first prediction residual block including first video data of the encoded video block, the second symbol representing a second transform block partition type used during a transform-level partitioning performance limited to a single, non-recursive transform-level partitioning of a second prediction residual block including second video data of the encoded video block, wherein the first transform block partition type and the second transform block partition type are different;

producing the first prediction residual block according to the first symbol by inverse transforming and combining a plurality of first encoded transform sub-blocks associated with the first video data;

producing the second prediction residual block according to the second symbol by inverse transforming and combining a plurality of second encoded transform sub-blocks associated with the second video data;

reconstructing a video block including the first video data and the second video data using the first prediction residual block and the second prediction residual block; and outputting the video block within an output video stream for storage or display.

10. The method of claim 9, wherein a selection of the first transform block partition type for the first prediction residual block during an encoding of the encoded video block and a selection of the second transform block partition type for the second prediction residual block during the encoding of the encoded video block are both independent of whether the first video data and the second video data are encoded using an intra-prediction mode or an inter-prediction mode.

11. The method of claim 9, wherein a shape of first inverse transformed blocks produced by inverse transforming each of the plurality of first encoded transform sub-blocks is different than a shape of the first prediction residual block, and wherein a shape of second inverse transformed blocks produced by inverse transforming each of the plurality of second encoded transform sub-blocks is different than a shape of the second prediction residual block.

12. The method of claim 9, wherein the first transform block partition type and the second transform block partition type are each selected from multiple available transform block partition types, wherein a learning model is used during the encoding of the encoded video block to determine ones of the multiple available transform block partition types to exclude one or both of a selection of the first transform block partition type for the first prediction residual block or a selection of the second transform block partition type for the second prediction residual block.

13. The method of claim 9, wherein each of the plurality of first encoded transform sub-blocks and each of the plurality of second encoded transform sub-blocks has a size equal to one of 4×64, 64×4, 4×32, 32×4, 8×64, or 64×8.

14. The method of claim 9, wherein each of the plurality of first encoded transform sub-blocks corresponds to at least one fourth of the first video data and each of the plurality of second encoded transform sub-blocks corresponds to at least one fourth of the second video data.

15. A method for decoding an encoded video block from a bitstream, the method comprising:

deriving, from a bitstream to which the encoded video block is encoded, a symbol representing a transform block partition type used during a transform-level partitioning performance limited to a single, non-recursive transform-level partitioning of a prediction residual block encoded to produce the encoded video block;

producing a first inverse transformed block by inverse transforming a first encoded transform sub-block associated with first video data of the prediction residual block;

producing a second inverse transformed block by inverse transforming a second encoded transform sub-block associated with second video data of the prediction residual block;

producing, according to the transform block partition type represented by the symbol, the prediction residual block using the first inverse transformed block and the second inverse transformed block;

reconstructing a video block including the first video data and the second video data using the prediction residual block; and outputting the video block within an output video stream for storage or display.

16. The method of claim 15, wherein the symbol is a first symbol, the transform block partition type is a first transform block partition type, and the prediction residual block is a first prediction residual block, and wherein the method further comprises:

deriving, from the bitstream, a second symbol representing a second transform block partition type used for non-recursive transform-level partitioning of a second prediction residual block associated with the encoded video block;

producing a third inverse transformed block by inverse transforming a third encoded transform sub-block associated with third video data of the second prediction residual block;

producing a fourth inverse transformed block by inverse transforming a fourth encoded transform sub-block associated with fourth video data of the second prediction residual block; and producing, according to the second transform block partition type represented by the symbol, the second prediction residual block using the third inverse transformed block the fourth inverse transformed block, and wherein reconstructing the video block including the first video data and the second video data using the prediction residual block comprises reconstructing the video block using the first prediction residual block and the second prediction residual block.

17. The method of claim 15, wherein a shape of each of the first inverse transformed block and the second inverse transformed block is different than a shape of the prediction residual block.

18. The method of claim 15, wherein the transform block partition type is selected from the at least some of multiple transform block partition types, wherein a learning model is used during the encoding of the encoded video block to determine ones of the multiple transform block partition types to exclude from a selection of the transform block partition type for the prediction residual block.

19. The method of claim 15, wherein each of the first inverse transformed blocks and the second inverse transformed block has a size equal to one of 4×64, 64×4, 4×32, 32×4, 8×64, or 64×8.

20. The method of claim 15, wherein the first inverse transformed block corresponds to at least one fourth of the first video data and the second inverse transformed block corresponds to at least one fourth of the second video data.

* * * * *